J. C. BASHFORD.
STEERING KNUCKLE FOR VEHICLES.
APPLICATION FILED JAN. 17, 1908.
904,296.
Patented Nov. 17, 1908.
2 SHEETS—SHEET 1.
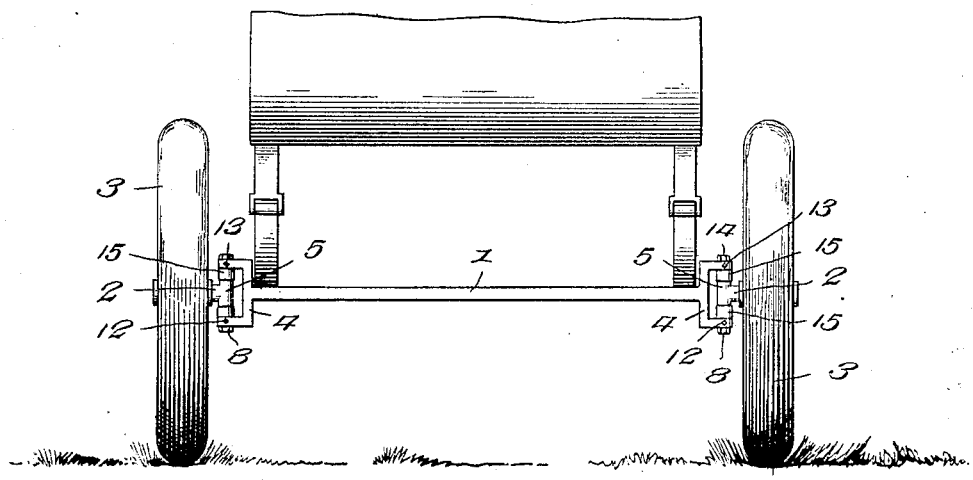
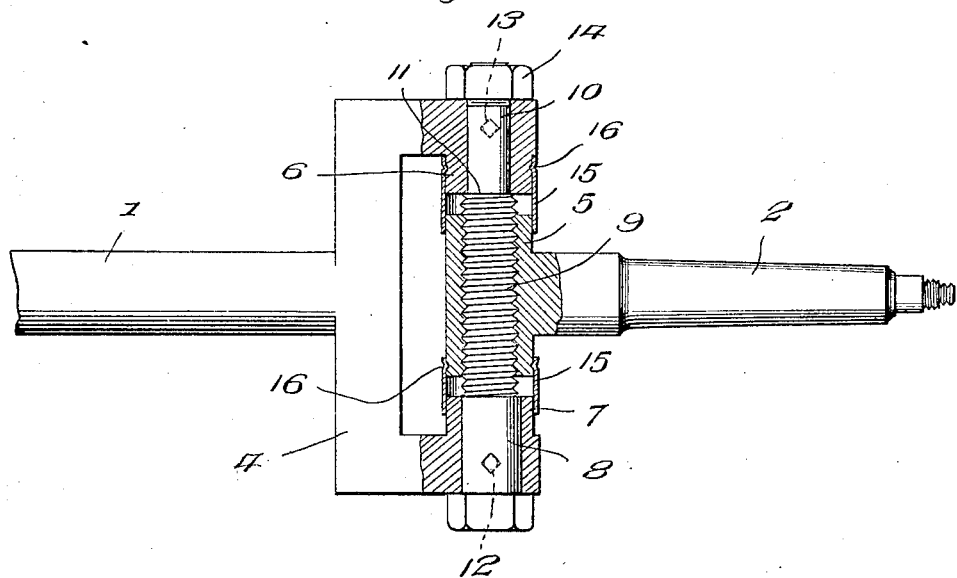
WITNESSES:
INVENTOR
J. C. Bashford
BY
W. J. Fitzgerald & Co.
Attorneys

J. C. BASHFORD.
STEERING KNUCKLE FOR VEHICLES.
APPLICATION FILED JAN. 17, 1908.

904,296.

Patented Nov. 17, 1908.

2 SHEETS—SHEET 2.

WITNESSES:

INVENTOR
J. C. Bashford
BY
W. T. FitzGerald & Co.
Attorneys

UNITED STATES PATENT OFFICE.

JOHN COATES BASHFORD, OF YONKERS, NEW YORK.

STEERING-KNUCKLE FOR VEHICLES.

No. 904,296.      Specification of Letters Patent.      Patented Nov. 17, 1908.

Application filed January 17, 1908. Serial No. 411,377.

*To all whom it may concern:*

Be it known that I, JOHN C. BASHFORD, a citizen of the United States, residing at Yonkers, in the county of Westchester and State of New York, have invented certain new and useful Improvements in Steering-Knuckles for Vehicles; and I do hereby declare the following to be a full, clear, and exact description of the invention, such as will enable others skilled in the art to which it appertains to make and use the same.

My invention relates to new and useful improvements in attachments for vehicles and more particularly for use in connection with automobile gears and my object is to provide means to prevent undue wear at the pivotal connection between the axle and spindle of the vehicle.

A further object is to provide means for counteracting or distributing the weight at the bearing points.

A further object is to provide means for adjusting the parts of the attachment and a still further object is to provide means for excluding dust, grit and the like from the bearing parts of the pivoted joints.

Other objects and advantages will be hereinafter referred to and more particularly pointed out in the claims.

Figure 3:
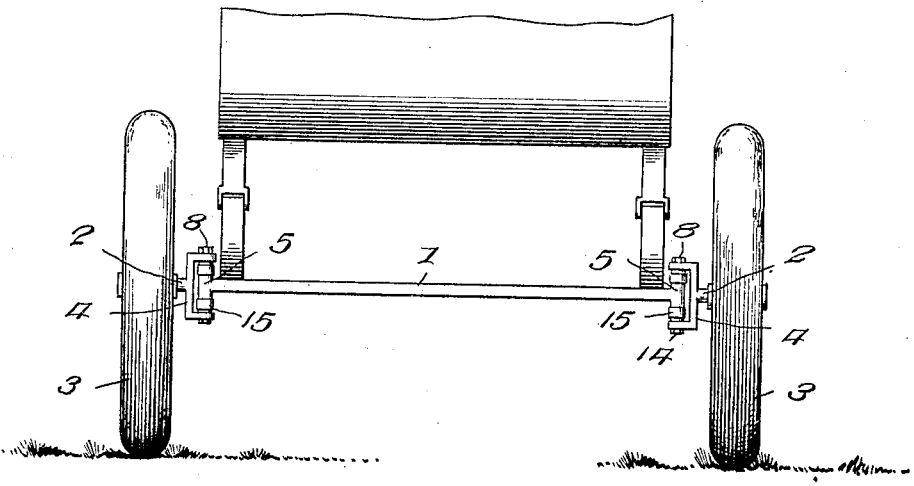
Figure 4:
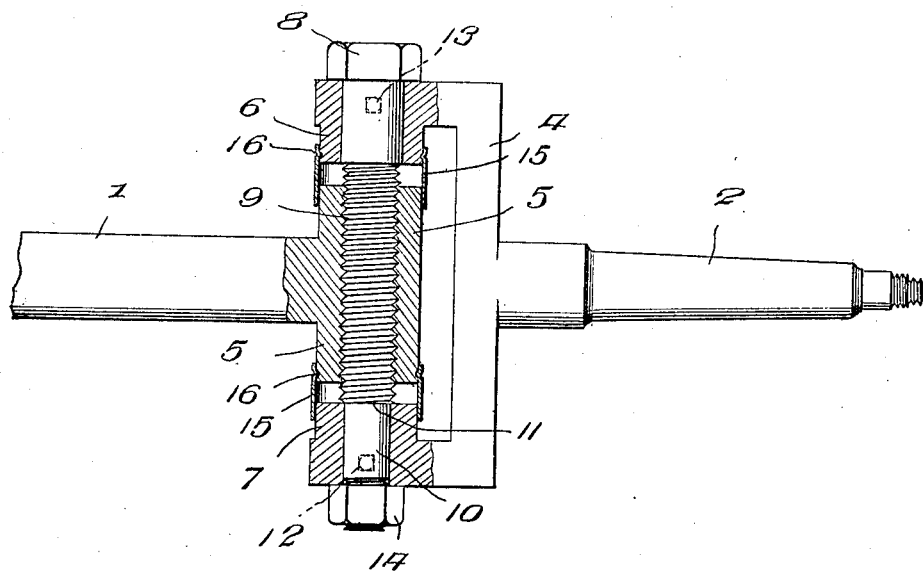

In the accompanying drawings which are made a part of this application, Figure 1 is an elevation of the forward truck of an automobile, showing my improved attachment secured thereto. Fig. 2 is a sectional view of a portion of the forward axle on an enlarged scale. Fig. 3 is a view similar to Fig. 1, showing the pivotal connection between the axle and spindle in reverse order from that shown in Fig. 1, and, Fig. 4 is a sectional view of one end of the axle and spindle on an enlarged scale.

Referring to the drawings in which similar reference numerals designate corresponding parts throughout the several views, 1 indicates the forward axle of a vehicle, such as is commonly used in connection with automobiles or similarly propelled vehicles and 2 indicates the spindle employed for supporting the wheels 3 and, as shown in Figs. 1 and 2 of the drawings, a yoke 4 is fixed to the ends of the axle 1, while the inner end of the spindle 2 is provided with a threaded socket 5, which is adapted to fit between collars 6 and 7 at the upper and lower ends of the yoke 4, said socket being held in position by means of a bolt 8, a portion of which bolt is provided with threads 9, which are adapted to engage the threaded portion of the socket 5. The length of the socket 5 is less than the distance between the collars 6 and 7, so that said socket may be adjusted between said collars to raise or lower the end of the axle, while the threads on the bolt 8 extend from one collar to the other, the opening in the collar 7 being of sufficient diameter to freely receive the threaded portion of the bolt, while the opening through the collar 6 is reduced in size to snugly receive the reduced end 10 of the bolt, a shoulder 11 being formed at the intersection of the reduced end 10 with the threaded portion 9 of the bolt, whereby the collar 6 will engage said shoulder when the bolt is properly located in the yoke.

As shown in Figs. 1 and 2, the bolt 8 is preferably introduced from the lower end of the yoke, as the weight on the axle will render an upward strain on the bolt and, by introducing the bolt from the lower end of the yoke, the head of the bolt will engage the lower portion of the yoke and the shoulder the upper portion of the yoke and receive the major portion of the strain. It will further be seen that by providing threads throughout the length of the socket 5, and the head and shoulder on the bolt, the strain will be equally distributed between the bolt, yoke and socket.

The bolt is held in a fixed position in the yoke by providing locking bolts 12 and 13 at opposite ends of the bolt 8, said locking bolts extending through threaded openings in the ends of the yoke, or through the collars 6 and 7 and binding on the face of the bolt 8, thereby holding said bolt against rotation and the bolt is further held in position through the yoke and socket by introducing a nut 14 on the threaded portion of the reduced end 10.

In view of the fact that the socket 5 is swung upon the threaded portion of the bolt 8, dust, or other forms of grit would soon destroy the threads and, to exclude the dust from the threads in the socket and on the bolt, I provide shields 15, which are preferably in the form of bands, one of which is fixed around the collar at the upper end of the yoke and the other around the lower end of the socket, said collars being secured in position in any preferred manner, as by crimping portions of the shields into recesses 16 in the peripheral surfaces of said collar and socket, the opposite ends of said shields surrounding the end of the socket 5 and lower collar, respectively, said shields fitting around the parts with sufficient snugness to prevent water or grit from entering between the socket and shield.

If, for any reason, it is desired to adjust the height of the ends of the axle 1, the locking bolts 12 and 13 are loosened and the bolt 8 rotated, the turning of said bolt to the left or right, raising or lowering the socket on said bolts and correspondingly lowering or elevating the end of the axle and after the axle has been adjusted to the proper position, the locking bolts 12 and 13 are again tightened, which will prevent further rotation of the bolt 8 and retain the socket in its adjusted position.

In Figs. 3 and 4 of the drawings, I have shown the yokes 4 as connected to the spindles 2, while the socket 5 is fixed to the end of the axle 1 and, in this construction, a downward pull will be given on the bolt 8, so that in utilizing the greatest strength of the bolt for resisting the strain thereon, said bolt is introduced from the upper end of the yoke. By this construction, the end of the axle will be moved vertically when the spindle is swung laterally to guide the vehicle, this movement distributing and reducing the friction and weight at this point.

It will thus be seen that I have provided a very cheap and economical attachment for the pivotal parts of the steering gear of an automobile and one which may be readily adjusted to increase or decrease the height of either or both ends of the axle. It will likewise be seen that by securing the bolt in the manner shown, the greatest weight on the bolt will be directed against the strongest portion thereof and that by extending the threads the full length of the socket, the strain will be equally distributed throughout the length of the socket, as well as through the bolt and yoke. It will likewise be seen that I have provided a very cheap and economical means for excluding dust or other forms of grit from the bearing parts of the axle and, while I have shown and described the attachment as used in connection with the forward axle of an automobile, it will be readily seen that said attachment may be employed in connection with any similar form of pivotally connected parts.

What I claim is:

1. The herein described attachment for vehicles, comprising the combination with a yoke of an interiorly threaded socket adapted to be disposed between the ends of said yoke and a bolt extending through said yoke and socket, said bolt having threads on a portion of its length adapted to engage the threads in said socket and means to hold said bolt against rotation.

2. The herein described attachment for the pivotal parts of vehicles, comprising a yoke having collars thereon, an interiorly threaded socket adapted to extend between said collars and of less length than the distance between said collars, a bolt having a portion of its length threaded, said threads being adapted to engage the threads in the socket, means to hold said bolt in its adjusted position and shields for the ends of the socket and collars.

3. The herein described means for pivotally mounting a spindle to an axle, comprising the combination with a yoke having collars thereon; of an interiorly threaded socket adapted to be adjustably mounted between said collars, a bolt adapted to extend through said collars and yoke and through the socket, threads on that portion of the bolt between the collars adapted to engage threads in the socket and adjust the socket when the bolt is rotated and means to hold said bolt against rotation.

4. The herein described attachment for parts of vehicles, comprising the combination with a yoke having collars thereon, a socket between said collars, a bolt extending through said yoke and socket and means on the bolt to adjust said socket longitudinally of the bolt; of shields surrounding the ends of said collars and socket to prevent dust, or the like from entering between the collars and ends of the socket, and means to secure one of said shields to the upper collar and the opposite shield to the lower end of the socket, respectively.

In testimony whereof I have signed my name to this specification in the presence of two subscribing witnesses.

JOHN COATES BASHFORD.

Witnesses:
  HENRIETTA BASHFORD,
  ETTA SECOR GRACEY.